(12) United States Patent
Miyashita et al.

(10) Patent No.: US 7,965,009 B2
(45) Date of Patent: Jun. 21, 2011

(54) MOTOR ROTOR AND MANUFACTURING METHOD THEREOF

(75) Inventors: Toshihito Miyashita, Nagano (JP);
 Takashi Matsushita, Nagano (JP);
 Norihito Tanaka, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 238 days.

(21) Appl. No.: 12/445,805

(22) PCT Filed: Oct. 16, 2007

(86) PCT No.: PCT/JP2007/070112
 § 371 (c)(1),
 (2), (4) Date: Jun. 18, 2009

(87) PCT Pub. No.: WO2008/047767
 PCT Pub. Date: Apr. 24, 2008

(65) Prior Publication Data
 US 2010/0295402 A1 Nov. 25, 2010

(30) Foreign Application Priority Data

Oct. 17, 2006 (JP) .................................. 2006-282952

(51) Int. Cl.
 *H02K 1/28* (2006.01)
 *H02K 1/30* (2006.01)
 *H02K 21/12* (2006.01)
 *H02K 1/22* (2006.01)
 *H02K 15/00* (2006.01)
 *H02K 15/02* (2006.01)

(52) U.S. Cl. .. 310/156.28; 29/596; 29/598; 310/156.29; 310/156.31; 310/156.12; 310/156.21; 310/156.23; 310/271; 310/261.1

(58) Field of Classification Search ..................... 29/596, 29/598; 310/156.28, 156.29, 156.31, 216.113, 310/261.1, 156.14, 156.21, 156.23; H02K 1/28, 1/30, 21/12, 15/02, 1/22

See application file for complete search history.

(56) References Cited

U.S. PATENT DOCUMENTS 5,942,829 A * 8/1999 Huynh .......................... 310/178
(Continued)

FOREIGN PATENT DOCUMENTS

JP 62-172268 10/1987
(Continued)

OTHER PUBLICATIONS

Machine translation of Takeda JP 62-172268U , Oct. 1987, pp. 6-8.*
(Continued)

*Primary Examiner* — Quyen Leung
*Assistant Examiner* — Terrance Kenerly
(74) *Attorney, Agent, or Firm* — Rankin, Hill & Clark LLP

(57) ABSTRACT

A motor rotor has a resin-impregnated thread layer formed by winding a thread of a reinforced fiber material around a permanent magnet layer with a gap between an outer peripheral surface of the thread layer and an inner peripheral surface of a cylindrical body, and impregnating the thread layer with a curable resin. A subsequent thread layer is formed by leading a continuous thread into an annular passage through thread passing recesses, winding the continuous thread around a bottom portion of the passage, and impregnating the subsequent thread layer with a curable resin. A curable resin is injected into the gap between the outer peripheral surfaces of the thread layer and the subsequent thread layer and the inner peripheral surface of the cylindrical body through resin injection passages and/or the thread passing recesses before heating and curing.

17 Claims, 11 Drawing Sheets

U.S. PATENT DOCUMENTS

| | | | |
|---|---|---|---|
| 6,750,580 B2 * | 6/2004 | Lai et al. | 310/156.28 |
| 6,920,582 B2 * | 7/2005 | Alt et al. | 714/30 |
| 6,963,151 B2 * | 11/2005 | Van Dine | 310/87 |
| 7,612,478 B2 * | 11/2009 | Marioni | 310/156.28 |
| 2002/0084710 A1 * | 7/2002 | Worley et al. | 310/156.23 |
| 2004/0070306 A1 * | 4/2004 | Gysin | 310/261 |
| 2006/0022541 A1 * | 2/2006 | Ong et al. | 310/156.53 |
| 2006/0226724 A1 * | 10/2006 | Cullen et al. | 310/156.28 |
| 2007/0114867 A1 * | 5/2007 | Marioni | 310/156.23 |
| 2009/0139079 A1 * | 6/2009 | Shibui et al. | 29/598 |
| 2010/0084936 A1 * | 4/2010 | Jones et al. | 310/114 |
| 2010/0171383 A1 * | 7/2010 | Petrov et al. | 310/156.28 |

FOREIGN PATENT DOCUMENTS

| | | | |
|---|---|---|---|
| JP | 03-011948 | | 1/1991 |
| JP | 04-368440 | | 12/1992 |
| JP | 10-174327 | | 6/1998 |
| JP | 10174327 | * | 6/1998 |
| WO | 2008/047767 | | 4/2008 |

OTHER PUBLICATIONS

Machine translation of Kawamata et al. jp10174327, Permanent Magnet Rotor and its Manufacturing Method, Jun. 1998.*

* cited by examiner

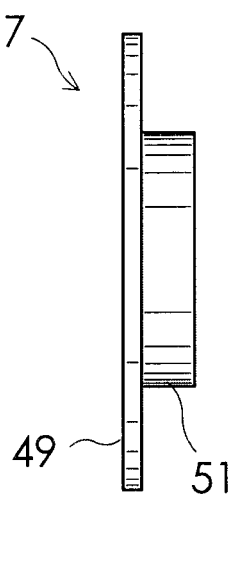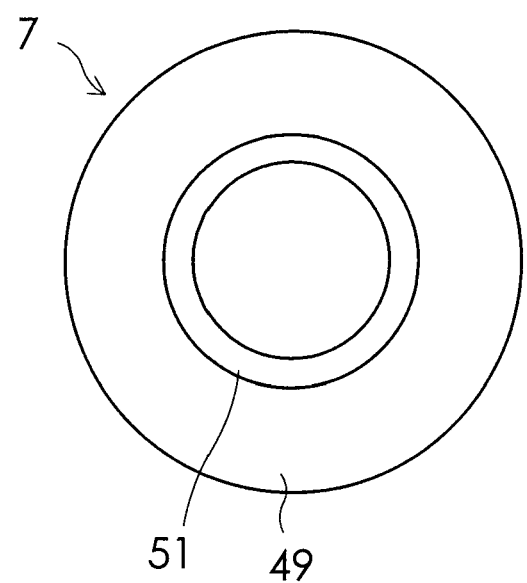

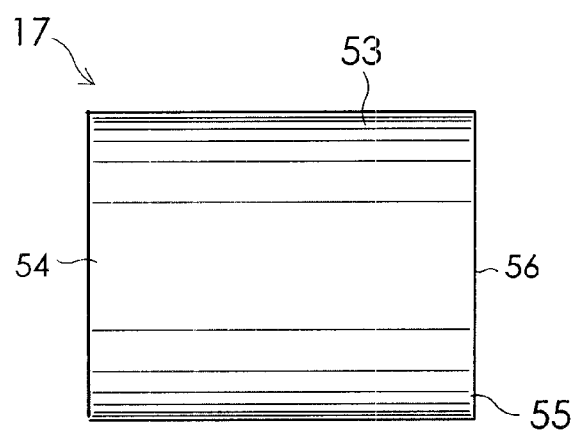 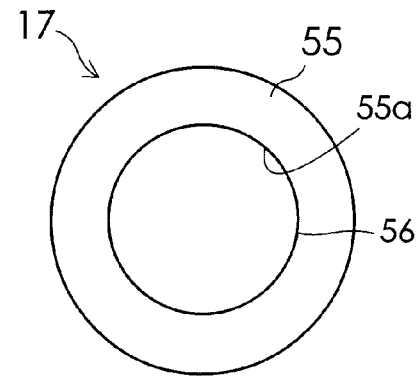

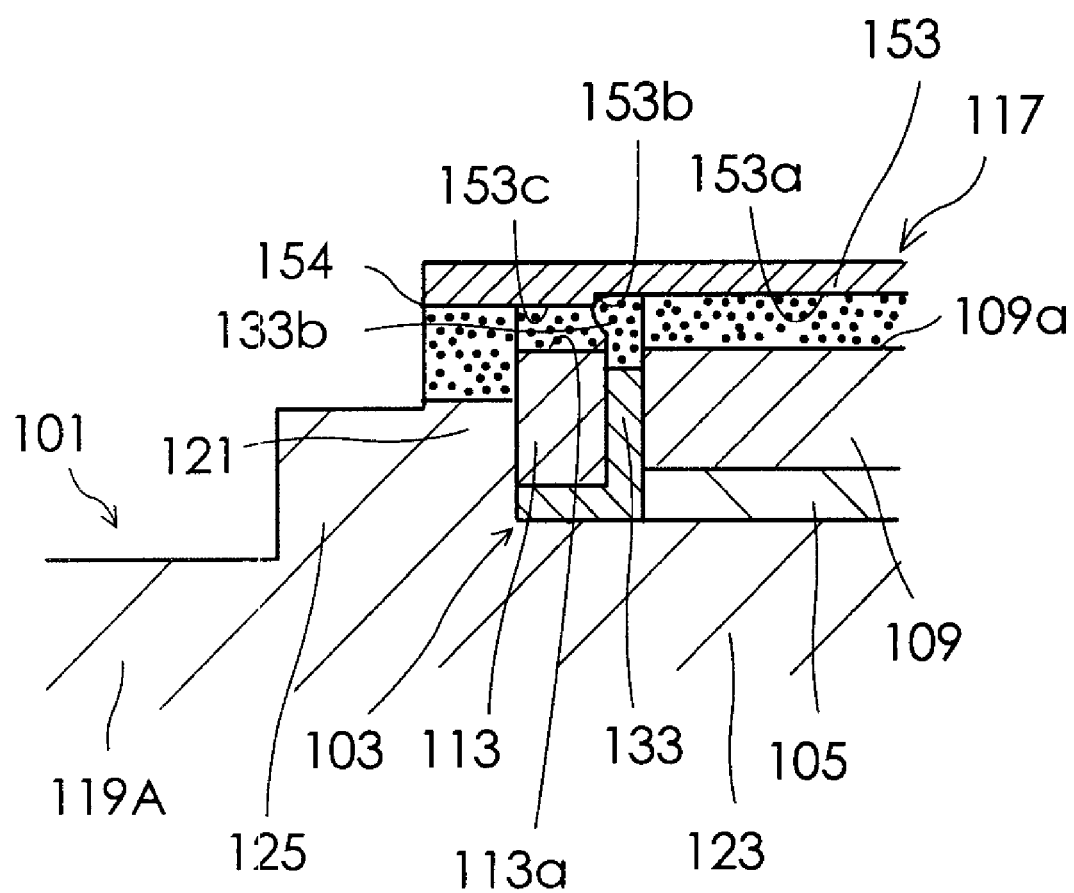

MOTOR ROTOR AND MANUFACTURING METHOD THEREOF

TECHNICAL FIELD

The present invention relates to a motor rotor and a method for manufacturing the motor rotor.

BACKGROUND ART

In general, a motor rotor includes a rotary shaft having a magnet mounting portion, and a permanent magnet layer formed of a plurality of permanent magnets disposed on a surface of the magnet mounting portion. If the motor rotor rotates at a high speed, however, the plurality of permanent magnets may be broken by a centrifugal force. Then, Japanese Patent No. 2847756 proposes a motor rotor including a thread layer formed by winding a thread of a reinforced fiber material around the permanent magnet layer, first and second annular members provided on the rotary shaft and respectively disposed on both ends of the magnet mounting portion in the axial direction, and a cylindrical member fixed to the first and second annular members and in contact with a surface of the thread layer to cover it. The thread layer is impregnated with a curable resin. The first and second annular members and the cylindrical member are fixed by welding.

[Patent Document 1] Japanese Patent No. 2847756

DISCLOSURE OF INVENTION

Problem to be Solved by the Invention

Although the curable resin with which the thread layer is impregnated serves to mutually bond the threads, the resin itself is low in strength. Accordingly, if the conventional motor rotor rotates at a high speed of not less than 150,000 revolutions per minute, the cylindrical member is swelled by a centrifugal force so that a void is formed between the cylindrical member and the thread layer. Thus, if the resin with which the thread layer is impregnated is subjected to a centrifugal force in the direction of the void, the resin may be broken.

An object of the present invention is to provide a motor rotor and a method for manufacturing the motor rotor wherein a resin with which a thread layer is impregnated is prevented from being broken even if the motor rotor is rotated at a high speed.

Another object of the present invention is to provide a motor rotor and a method for manufacturing the motor rotor that facilitates the retention of a terminated end of a thread forming the thread layer.

Means for Solving the Problem

A motor rotor of which improvement is aimed by the present invention includes: a rotary shaft having a magnet mounting portion; a permanent magnet layer formed of a plurality of permanent magnets disposed on a surface of the magnet mounting portion; a thread layer formed by winding a thread of a reinforced fiber material around the permanent magnet layer; first and second annular members provided on the rotary shaft and respectively disposed on both ends of the magnet mounting portion in an axial direction of the rotary shaft; a cylindrical member fixed to the first and second annular members to cover a surface of the thread layer from a radially outer side of the rotary shaft with a gap formed between an outer peripheral surface of the thread layer and an inner peripheral surface of the cylindrical member; and a resin layer formed of a curable resin which has been injected into the gap and cured. The thread layer is impregnated with a curable resin. The language "first and second annular members provided on the rotary shaft and respectively disposed on both ends of the magnet mounting portion in an axial direction of the rotary shaft" includes a configuration where the first and/or second annular members are disposed in proximity to the magnet mounting portion, and a configuration where the first and/or second annular members are disposed at an interval from the magnet mounting portion. According to the present invention, the resin layer is formed in the gap between the outer peripheral surface of the thread layer and the inner peripheral surface of the cylindrical member, ensuring that the gap between the outer peripheral surface of the thread layer and the inner peripheral surface of the cylindrical body is fully filled with a resin. As a result, no void will be formed between the cylindrical member and the thread layer even if the motor rotor is rotated at a high speed. The resin layer that is positively formed only of a curable resin adheres to the cylindrical member with higher adhesion compared to a thin resin layer that is formed by a part of a curable resin with which a thread layer is impregnated and which has been cured. Thus, even if the motor rotor is rotated at a high speed and the resin with which the thread layer is impregnated is subjected to a centrifugal force, the resin layer positively formed on the outer side of the thread layer prevents separation of resin from the thread forming the thread layer.

If a motor rotor is used in a high-speed motor that rotates at a high speed of not less than 150,000 revolutions per minute, in particular, the resin in the thread layer may be easily peeled or cracked because of a centrifugal force. If the motor rotor according to the present invention is used in such high-speed motors, peeling and, cracking of the resin in the thread layer can be effectively prevented.

Preferably, the first annular member may be fitted in one opening portion of the cylindrical member located on one end in the axial direction of the rotary shaft, and may be formed with one or more resin injection passages for injecting the curable resin into the gap between the thread layer and the cylindrical member. The second annular member may tightly seal the other opening portion of the cylindrical member located on the other end in the axial direction. With this configuration, the curable resin may be injected into the gap between the thread layer and the cylindrical body after the first annular member is fitted in the one opening portion of the cylindrical body located on one end in the axial direction of the rotary shaft, allowing the gap between the thread layer and the cylindrical body to be completely filled with the curable resin.

Preferably, the one or more resin injection passages may be formed to penetrate the first annular member in the axial direction and open radially outwardly, and disposed at equidistant intervals in a circumferential direction of the rotary shaft. With this configuration, since the one or more resin injection passages open radially outwardly, the curable resin may be fully injected along the inner peripheral surface of the cylindrical member. Since the one or more resin injection passages are formed at intervals in the circumferential direction of the rotary shaft, the curable resin may be injected easily, and air bubbles contained in the curable resin may be removed without local deviation. The one or more resin injection passages may be formed as through holes penetrating the first annular member in the axial direction. Also with such through holes, the curable resin may be injected into the gap between the thread layer and the cylindrical member.

In the motor rotor according to the present invention, the second annular member may be disposed adjacent to an end of the magnet mounting portion on the other end in the axial direction, and an annular partition wall member may concentrically be disposed on the rotary shaft between the first and second annular members. The partition wall member may be disposed adjacent to an end of the magnet mounting portion on the one end in the axial direction so as to form an annular passage having a bottom portion located between the first annular member and the partition wall member. The partition wall member may be formed, in its outer periphery, with one or more thread passing recesses that allow a continuous thread, which is continuous with the thread forming the thread layer, to pass through and also allow the curable resin injected from the resin injection passage to pass through. A subsequent thread layer may be formed of the continuous thread that has passed through the thread passing recesses, and has been led into the annular passage and wound around the bottom portion under high tension with a gap formed between an outer peripheral surface of the subsequent thread layer and the inner peripheral surface of the cylindrical member. The subsequent thread layer may be impregnated with a curable resin. A resin layer extension, which is continuous with the resin layer, may be formed of the curable resin which has been injected into the gap from the resin injection passages and cured. If the subsequent thread layer is formed by leading the continuous thread into the annular passage and winding the continuous thread around the bottom portion of the passage under high tension as described above, the continuous thread forming the subsequent thread layer will not become loose because of the friction between the continuous thread in the subsequent thread layer and the first annular member and the partition wall member or the friction between windings of the continuous thread. This allows the terminated end of the thread forming the thread layer to be retained easily and reliably. The one or more thread passing recesses are formed to allow the curable resin injected from the resin injection passages to pass through. Therefore, even if the partition wall member is provided, the curable resin may be injected into the gap between the outer peripheral surface of the thread layer and the inner peripheral surface of the cylindrical member through the one or more thread passing recesses.

Preferably, the continuous thread may be wound around the bottom portion of the passage under such tension that prevents the continuous thread forming the subsequent thread layer from becoming loose (for example, under a high tension of 3 kgf or more).

Preferably, a plurality of the thread passing recesses may be formed at intervals in the circumferential direction of the rotary shaft. With this configuration, the thread that has formed the thread layer may be easily led into the annular passage irrespective of where winding of the thread for forming the thread layer has terminated. In addition, the curable resin may be easily injected into the gap between the outer peripheral surface of the thread layer and the inner peripheral surface of the cylindrical member through the one or more thread passing recesses.

Preferably, the curable resin may be a thermosetting resin. With the use of a thermosetting resin, it is possible to leave the injected curable resin uncured and cure the resin by heating the resin when necessary.

The motor rotor according to the present invention may be applied to both a rotor whose rotary shaft is supported by a bearing on both ends and a rotor whose rotary shaft is supported by a bearing only on one end.

The rotary shaft may have a composite structure including a first rotary shaft portion supported by a bearing, the first annular member, a shaft center portion including the magnet mounting portion, and a second rotary shaft portion that are sequentially arranged in this order in the axial direction. If such a rotary shaft is used, the partition wall member may include a cylindrical portion fitted on the shaft center portion and an annular partition wall portion integrally formed with an end of the cylindrical portion. The passage may be defined by the first annular member, the partition wall portion, and the cylindrical portion with an end of the cylindrical portion abutting on the first annular member. With this configuration, the annular passage for forming the subsequent thread layer may easily be formed by fitting the partition wall member on the shaft center portion of the rotary shaft structure.

Preferably, the first rotary shaft portion, the first annular member, the shaft center portion, and the second rotary shaft portion may be integrally formed with each other. With this configuration, the composite structure may easily be formed by cutting or casting.

The shaft center portion may be formed at a center portion of the rotary shaft and have a cylindrical shape. The second annular member may include a boss fitted on the rotary shaft and an annular portion integrally formed with the boss and extending radially from an end of the boss on a side of the shaft center portion. The second annular member may be fitted on the second rotary shaft portion and positioned to abut on an end surface of the shaft center portion on a side of the second rotary shaft portion. The cylindrical member may include a cylindrical body and an annular flange integrally formed with the cylindrical body and extending radially inwardly from an end of the cylindrical body on a side of the other opening portion. If the second annular member and the cylindrical member thus configured are used, the cylindrical member may be assembled with the first and second annular members such that the inner peripheral surface of the cylindrical member at the one opening portion, which is located on the one end in the axial direction of the rotary shaft, is coupled to an outer peripheral surface of the first annular member and an annular inner surface of the flange abuts on an outer peripheral surface of the boss of the second annular member. With this configuration, the cylindrical member may easily be mounted on the first and second annular members by sliding the cylindrical member and the first and second annular members relative to each other such that the first and second annular members are disposed inside the cylindrical member.

The cylindrical member may be fixed to the first and second annular members by shrink fitting, namely, by first heating the cylindrical member, mounting the cylindrical member on the first and second annular members, and then cooling the cylindrical member. Thus, the cylindrical member which has been heated to be expanded is mounted on the first and second annular members, and then shrunk to be securely fixed to the first and second annular members.

Here, preferably, a projection may be integrally formed in the one opening portion of the cylindrical member to project radially inwardly of the rotary shaft so as to form a stepped portion in the cylindrical member, and the stepped portion is engaged with a radially outer end portion of the partition wall portion. With this configuration, the stepped portion of the cylindrical member for engagement engages with an engagement protrusion formed on the partition wall portion, preventing the cylindrical member from slipping off.

The motor rotor according to the present invention may be manufactured as follows.

A rotary shaft is prepared that has a composite structure including a first rotary shaft portion supported by a bearing, a first annular member, a shaft center portion including a magnet mounting portion, and a second rotary shaft portion that are integrally formed and sequentially arranged in this order in the axial direction. The first annular member is formed in advance with one or more resin injection passages for injecting a curable resin into a gap between a thread layer and a cylindrical member after the first annular member is fitted in one opening portion of the cylindrical member located on one end in the axial direction. An annular partition wall member is prepared that is concentrically disposed on the rotary shaft between the first annular member and a second annular member. The partition wall member is formed, in its outer periphery, with one or more thread passing recesses that allow a continuous thread, which is continuous with a thread forming the thread layer, to pass through and also allow the curable resin injected from the resin injection passages to pass through. The partition wall member is fitted on the shaft center portion of the rotary shaft so as to form an annular passage having a bottom portion between the partition wall member and the first annular member. The above components are prepared, and then a permanent magnet layer is formed on the magnet mounting portion included in the shaft center portion. The second annular member is fitted on the second rotary shaft portion to fix the second annular member to the rotary shaft with the second annular member abutting on an end of the shaft center portion on the other end in the axial direction, before or after forming the permanent magnet layer. The thread layer is formed by winding the thread of a reinforced fiber material around the permanent magnet layer with a gap formed between an outer peripheral surface of the thread layer and an imaginary surface extending between a radially outer periphery of the partition wall member and a radially outer periphery of the second annular member. The thread layer is impregnated with a first curable resin. A subsequent thread layer is formed by leading the continuous thread into the annular passage through the thread passing recesses and winding the continuous thread around the bottom portion under high tension with a gap formed between an outer peripheral surface of the subsequent thread layer and an imaginary surface extending between a radially outer periphery of the first annular member and the radially outer periphery of the partition wall member. The subsequent thread layer is impregnated with a second curable resin. The cylindrical member is fixed to the first and second annular members so as to cover the surfaces of the thread layer and the subsequent thread layer from the radially outer side of the rotary shaft. The gap between the outer peripheral surface of the thread layer and an inner peripheral surface of the cylindrical member is filled with a third curable resin through the one or more resin injection passages formed in the first annular member and the one or more thread passing recesses formed in the partition wall member. The gap between the outer peripheral surface of the subsequent thread layer and the inner peripheral surface of the cylindrical member is filled with a fourth curable resin through the one or more resin injection passages. Finally, the third and fourth curable resins are cured.

According to the above method for manufacturing a motor rotor, the motor rotor according to the present invention may be manufactured by simple processes such as fitting components. Since the curable resin may be injected into the gap between the thread layer and the cylindrical member after the cylindrical member is mounted on the first and second annular members, the gap between the thread layer and the cylindrical member may be fully filled with the curable resin.

If the first to fourth curable resins are thermosetting resins of the same quality of material, preferably, the third and fourth curable resins are injected before the first and second curable resins are cured so that the first to fourth curable resins are cured at one time. In this way, the mutual bonding strength of the first to fourth curable resins may be enhanced.

Preferably, air bubbles contained in the first to fourth curable resins may be removed through the one or more resin injection passages and the one or more thread passing recesses before the first to fourth curable resins are cured at one time. Consequently, the resin layer is filled with the resin without a void, and therefore it is unlikely that a void will be formed between the cylindrical member and the thread layer even if the motor rotor is rotated at a high speed.

The cylindrical member may be fixed to the first and second annular members by shrink fitting, namely, by first heating the cylindrical member, mounting the cylindrical member on the first and second annular members, and then cooling the cylindrical member. Thus, the cylindrical member which has been heated to be expanded is mounted on the first and second annular members, and then shrunk to be securely fixed to the first and second annular members.

BRIEF DESCRIPTION OF DRAWINGS

FIGS. 5(A) and 5(B) are a right side view and a back view, respectively, of a second annular member for use in the motor rotor shown in FIG. 1.

FIGS. 6(A) and 6(B) are a right side view and a back view, respectively, of a cylindrical member for use in the motor rotor shown in FIG. 1.

FIG. 9 is an enlarged view showing an engagement portion between a cylindrical member and a partition wall member of a motor rotor according to another embodiment of the present invention.

BEST MODE FOR CARRYING OUT THE INVENTION

Figure 1:
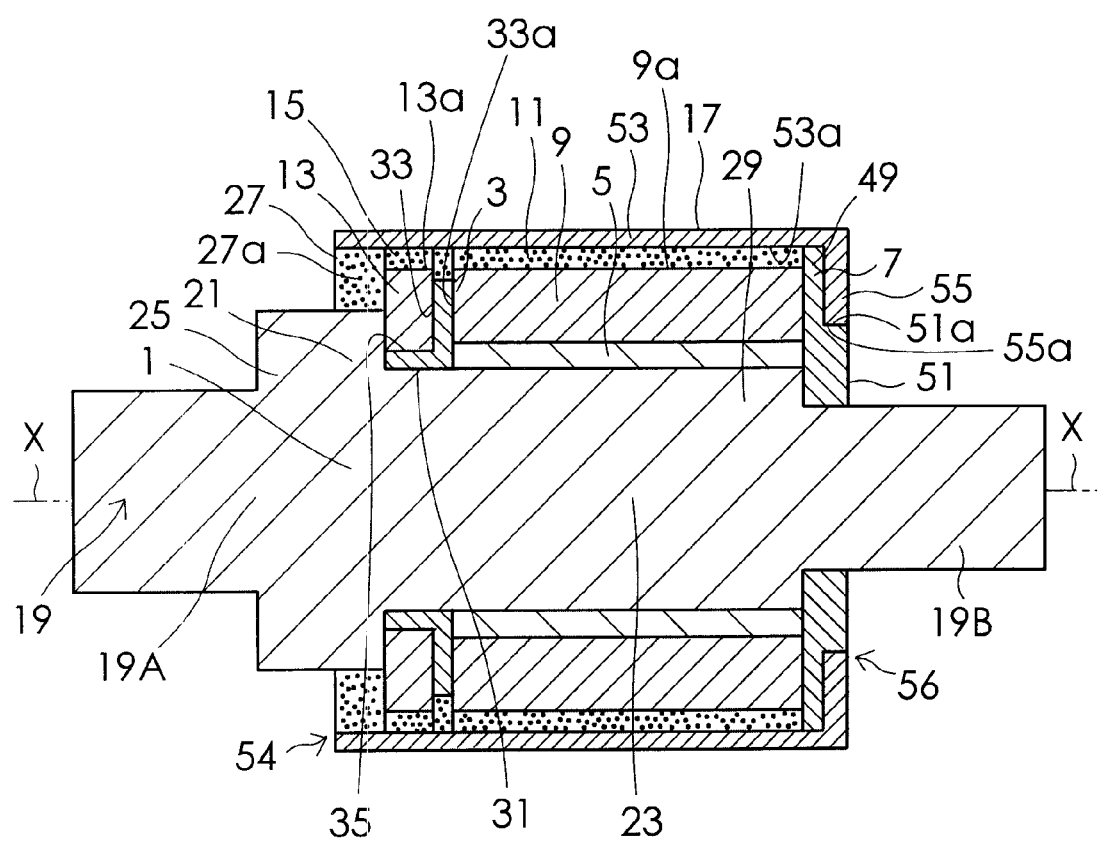
FIG. 1 is a cross-sectional view of a motor rotor according to an embodiment of the present invention.
Figure 2A:
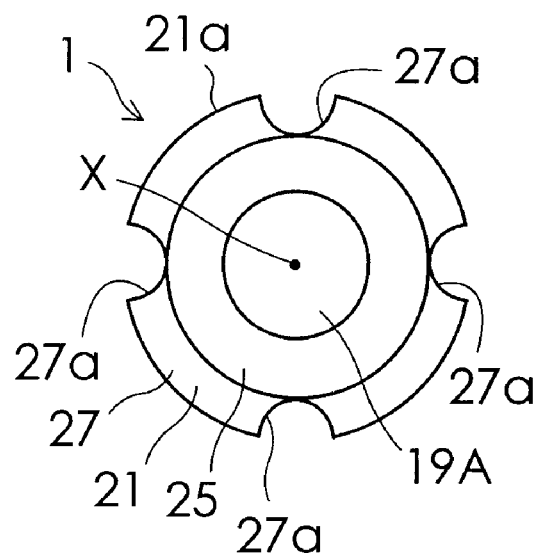
FIGS. 2(A) and 2(B) are a front view and a right side view, respectively, of a rotary shaft structure for use in the motor rotor shown in FIG. 1.
Figure 2B:
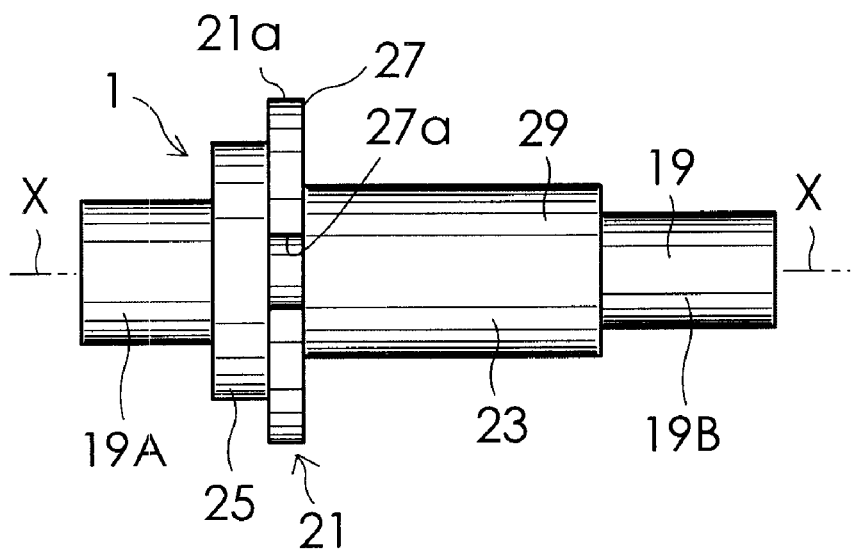

Hereinafter, an embodiment of the present invention will be described in detail with reference to the drawings. FIG. 1 is a cross-sectional view of a motor rotor according to an embodiment of the present invention for use in a high-speed motor that rotates at a high speed of not less than 150,000 revolutions per minute (rpm). FIGS. 2(A) and 2(B) are a front view and a right side view, respectively, of a rotary shaft structure for use in the motor rotor of this embodiment. As shown in FIG. 1, the motor rotor of this embodiment includes a rotary shaft structure 1, a partition wall member 3, a permanent magnet layer 5, a second annular member 7, a thread layer 9, a resin layer 11, a subsequent thread layer 13, a resin layer extension 15, and a cylindrical member 17. The rotary shaft structure 1 includes a rotary shaft 19 according to the present invention, and is made of a martensitic stainless steel in this embodiment. As shown in FIGS. 2(A) and 2(B), the rotary shaft structure 1 has a composite structure including a first rotary shaft portion 19A supported by a bearing, a first annular member 21, a shaft center portion 23, and a second rotary shaft portion 19B, which are sequentially arranged in this order in the axial direction (the direction in which an axis X of the rotary shaft 19 extends). The first annular member 21 is formed adjacent to one end of a magnet mounting portion 29, to be discussed later, in the direction of the axis X (opposite と the other end at which the second annular member 7, to be discussed later, is mounted). The first annular member 21 has a small diameter portion 25 that is larger in diameter than the first rotary shaft portion 19A and coaxial with the first rotary shaft portion 19A, and a large diameter portion 27 that is larger in diameter than the small diameter portion 25. The large diameter portion 27 is formed with four resin injection passages 27a for injecting a curable resin into the gap between the thread layer 9 and the cylindrical member 17. The four resin injection passages 27a are formed at equidistant intervals in a circumferential direction of the rotary shaft structure 1, and penetrate the large diameter portion 27 in a direction of the axis X of the rotary shaft 19 and open radially outwardly. The shaft center portion 23 is formed at a center portion of the rotary shaft structure 1 (the rotary shaft 19) and has a cylindrical shape. The shaft center portion 23 is smaller in diameter than the first annular member 21. The partition wall member 3, to be discussed later, is fitted on a portion of the shaft center portion 23 on the left side as seen in FIG. 1. The magnet mounting portion 29 is formed of the remaining portion of the shaft center portion 23 (on the right side as seen in FIG. 1), on which the partition wall member 3 is not fitted.

Figure 3A:
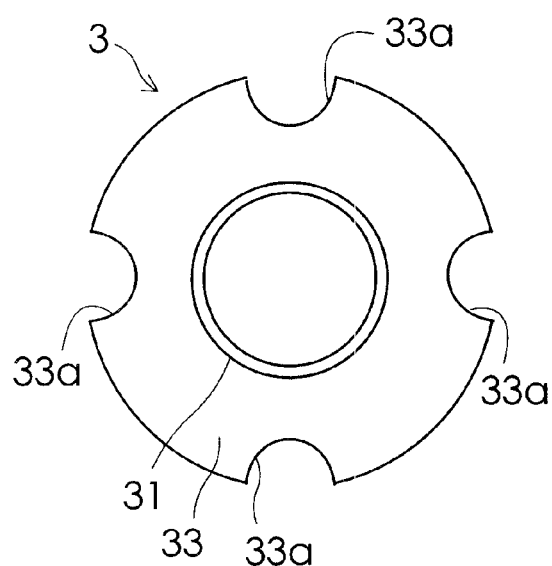
FIGS. 3(A) and 3(B) are a front view and a right side view, respectively, of a partition wall member 3 for use in the motor rotor shown in FIG. 1.
Figure 3B:
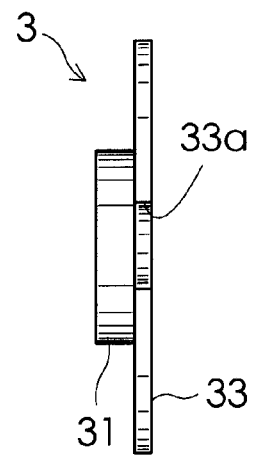

FIGS. 3(A) and 3(B) are a front view and a right side view, respectively, of the partition wall member 3 for use in the motor rotor of this embodiment. The partition wall member 3 is made of an austenitic stainless steel, and has a cylindrical portion 31 fitted on the shaft center portion 23 and an annular partition wall portion 33 integrally formed with an end of the cylindrical portion 31 as shown in FIGS. 3(A) and 3(B). The cylindrical portion 31 is fitted on the shaft center portion 23 with an end of the cylindrical portion 31 abutting on the large diameter portion 27 of the first annular member 21. The annular partition wall portion 33 is concentrically disposed on the rotary shaft structure 1 (the rotary shaft 19). The partition wall portion 33 is thus disposed between the first annular member 21 and the second annular member 7. In this state, a passage 35 is defined by the first annular member 21, the cylindrical portion 31, and the partition wall portion 33 (see FIG. 7(B)). Four thread passing recesses 33a are formed in the outer periphery of the partition wall portion 33. The four thread passing recesses 33a are formed at equidistant intervals in the circumferential direction of the rotary shaft 19, and penetrate the partition wall portion 33 in the direction of the axis X and open radially outwardly. The thread passing recesses 33a allow a continuous thread 10, which is continuous with a thread 8, to be discussed later, forming the thread layer 9, to pass through, so that the continuous thread 10 forms a subsequent thread layer 13 to be discussed later (see FIG. 8(A)). The four thread passing recesses 33a also allow the curable resin injected from the four resin injection passages 27a to pass through.

Figure 4:
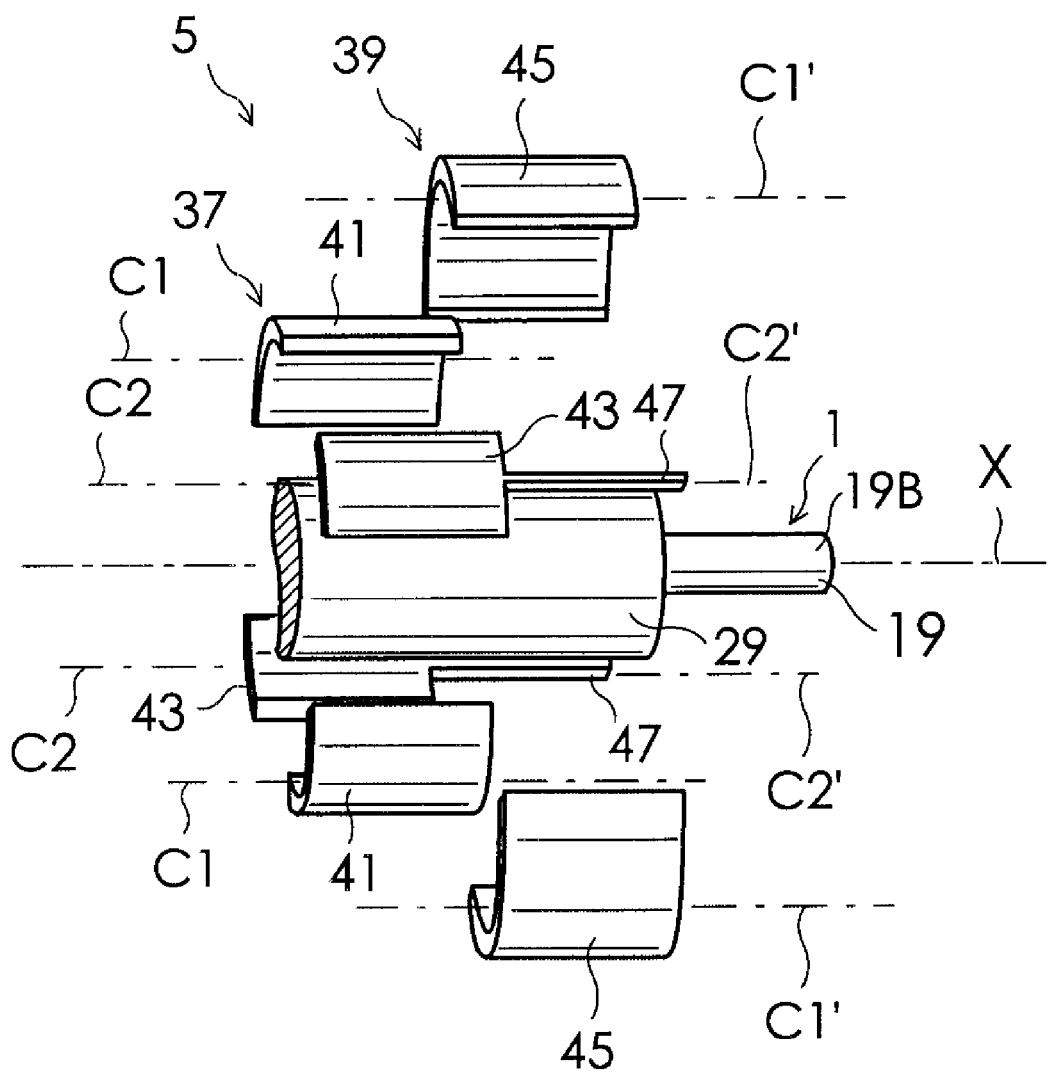
FIG. 4 is an exploded perspective view of a permanent magnet layer for use in the motor rotor shown in FIG. 1.

FIG. 4 is an exploded perspective view of the permanent magnet layer 5 for use in the motor rotor of this embodiment. FIG. 4 shows the structure of a rotor including the rotary shaft structure 1 with the first rotary shaft portion 19A and the first annular member 21 being omitted. As shown in FIG. 4, the permanent magnet layer 5 includes a first split rotor magnetic pole unit 37 and a second split rotor magnetic pole unit 39 arranged in the direction of the axis X of the rotary shaft 19, and is disposed on the surface of the magnet mounting portion 29. The first split rotor magnetic pole unit 37 includes two first-type permanent magnet magnetic pole portions 41 and two first-type salient pole portions 43 made of a magnetic material, provided on a part of the surface of the magnet mounting portion 29 and alternately arranged in the circumferential direction of the rotary shaft 19. The second split rotor magnetic pole unit 39 includes two second-type permanent magnet magnetic pole portions 45 and two second-type salient pole portions 47 made of a magnetic material, provided on the remaining part of the surface of the magnet mounting portion 29 and alternately arranged in the circumferential direction of the rotary shaft 19. The first split rotor magnetic pole unit 37 and the second split rotor magnetic pole unit 39 are arranged in the direction of the axis X of the rotary shaft 19, such that an imaginary center line C1 extending through the center of the first-type permanent magnet magnetic pole portions 41 in parallel to the axis X coincides with an imaginary center line C1' extending through the center of the second-type permanent magnet magnetic pole portions 45 in parallel to the axis X, and such that an imaginary center line C2 extending through the center of the first-type salient pole portions 43 in parallel to the axis X coincides with an imaginary center line C2' extending through the center of the second-type salient pole portions 47 in parallel to the axis X.

The pole arc angle of the first-type permanent magnet magnetic pole portions 41 is smaller than the pole arc angle of the second-type permanent magnet magnetic pole portions 45. The opening angle of the first-type salient pole portions 43 is larger than the opening angle of the second-type salient pole portions 47.

FIGS. 5(A) and 5(B) are a right side view and a back view, respectively, of the second annular member 7 for use in the motor rotor of this embodiment. The second annular member 7 is made of an austenitic stainless steel, and has an annular portion 49 and a boss 51 fitted on the rotary shaft 19 as shown in FIGS. 5(A) and 5(B). The annular portion 49 extends radially from an end of the boss 51 on the side of the shaft center portion 23. The second annular member 7 is fitted on the second rotary shaft portion 19B and positioned with the annular portion 49 abutting on an end surface of the shaft center portion 23 on the side of the second rotary shaft portion 19B. The second annular member 7 is thus disposed adjacent to the other end of the magnet mounting portion 29 in the direction of the axis X (opposite to the end at which the first annular member 21 is mounted). As described above, the first annular member 21 and the second annular member 7 are respectively provided on both ends of the shaft center portion 23 in the direction of the axis X. Consequently, the first annular member 21 and the second annular member 7 are respectively disposed on both ends of the magnet mounting portion 29.

The thread layer 9 is formed by winding a thread 8 of a reinforced fiber material, such as aramid fiber or carbon fiber, around the permanent magnet layer 5 under high tension. The thread layer 9 is impregnated with a curable resin which is a thermosetting resin (for example, an epoxy resin). Although a thermosetting resin is used as the curable resin in this embodiment, a photocurable resin that is cured by irradiation with ultraviolet light, for example, may also be used. The thread layer 9 is formed by winding the thread 8 around the permanent magnet layer 5 with a gap formed between the thread layer 9 and an imaginary surface extending between the radially outer periphery of the partition wall member 3 and the radially outer periphery of the second annular member 7 (see FIG. 7(D)). In this way, a gap is formed between an outer peripheral surface 9a of the thread layer 9 and an inner peripheral surface 53a of a cylindrical body 53 of the cylindrical member 17 to be discussed later.

The resin layer 11 is formed in the gap formed between the thread layer 9 and the cylindrical member 17. The resin layer 11 is formed by injecting a curable resin of the same type as the curable resin with which the thread layer 9 is impregnated into the gap between the outer peripheral surface 9a of the thread layer 9 and the inner peripheral surface 53a of the cylindrical body 53 and curing the injected curable resin.

The subsequent thread layer 13 is formed by leading the continuous thread 10, which is continuous with the thread 8 forming the thread layer 9, into the annular passage 35 through the thread passing recesses 33a of the partition wall portion 33, and winding the continuous thread 10 around a bottom portion 35a of the passage 35. The continuous thread 10 is wound around the bottom portion 35a of the passage 35 under such tension that prevents the continuous thread 10 forming the subsequent thread layer 13 from becoming loose. In this embodiment, the continuous thread 10 is wound around the bottom portion 35a of the passage 35 under a high tension of 3 kgf. The continuous thread 10 may be wound around the bottom portion 35a of the passage 35 under a tension of 3 kgf or more as long as the continuous thread 10 forming the subsequent thread layer 13 is prevented from becoming loose. The subsequent thread layer 13 is impregnated with a curable resin of the same type as the curable resin with which the thread layer 9 is impregnated. The subsequent thread layer 13 is formed by winding the continuous thread 10 around the bottom portion 35a with a gap formed between the subsequent thread layer 13 and an imaginary surface extending between the radially outer periphery of the first annular member 21 and the radially outer periphery of the partition wall member 3 (see FIG. 8(A)). In this way, a gap is formed between an outer peripheral surface 13a of the subsequent thread layer 13 and the inner peripheral surface 53a of the cylindrical body 53 to be discussed later.

The resin layer extension 15 is formed by injecting a curable resin of the same type as the curable resin with which the thread layer 9 is impregnated into the gap between the outer peripheral surface 13a of the subsequent thread layer 13 and the inner peripheral surface 53a of the cylindrical body 53 to be continuous with the resin layer 11, and curing the injected curable resin so as to be continuous with the resin layer 11.

FIGS. 6(A) and 6(B) are a right side view and a back view, respectively, of the cylindrical member 17 for use in the motor rotor of this embodiment. The cylindrical member 17 is made of titanium or a titanium alloy which is non-magnetic, and has the cylindrical body 53 and an annular flange 55 extending radially inwardly from an end of the cylindrical body 53 on the side of the other opening portion 56. The inner peripheral surface of the cylindrical portion 53 at one opening portion 54 is coupled to an outer peripheral surface 21a of the first annular member 21 (see FIGS. 1 and 2). An annular inner surface 55a of the flange 55 abuts on an outer peripheral surface 51a of the boss 51 of the second annular member 7. In this embodiment, the cylindrical member 17 is fixed to the first and second annular members 21, 7 by shrink fitting. The cylindrical body 53 thus covers the surface of the thread layer 9 from the radially outer side of the rotary shaft structure 1. With the cylindrical member 17 assembled with the first and second annular members 21, 7 in this way, the first annular member 21 is fitted in the one opening portion 54 of the cylindrical body 53. In addition, the second annular member 7 tightly seals the other opening portion 56 of the cylindrical body 53.

Figure 7A:
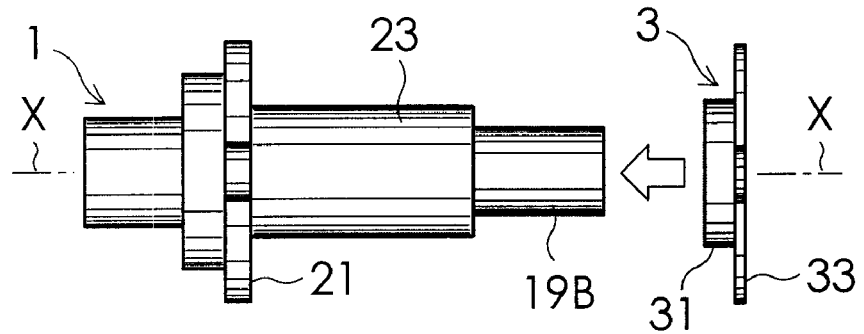
FIGS. 7(A) to 7(D) are used to describe an upstream process of a method for manufacturing the motor rotor shown in FIG. 1.
Figure 7B:
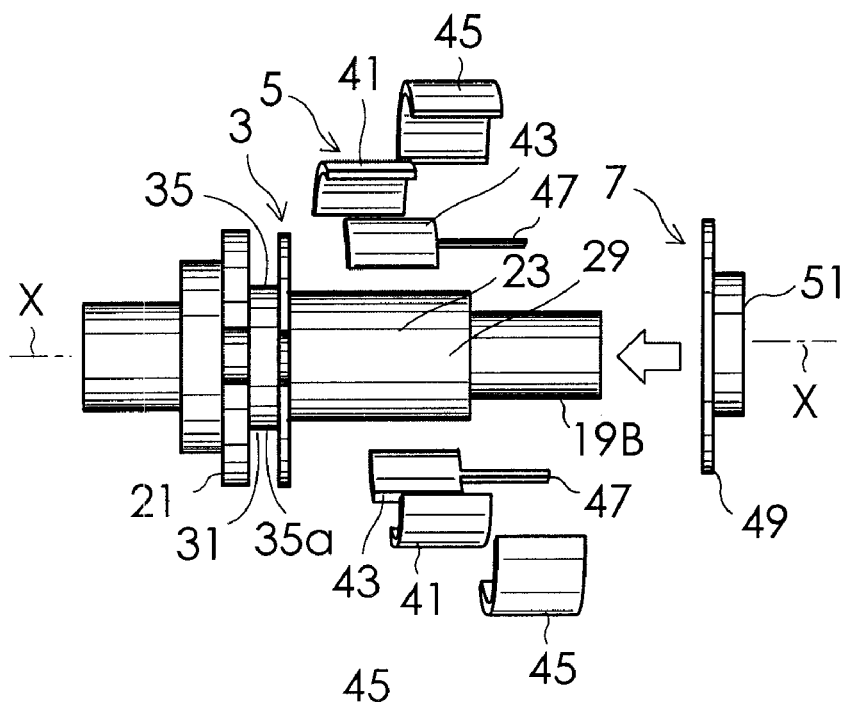
Figure 7C:
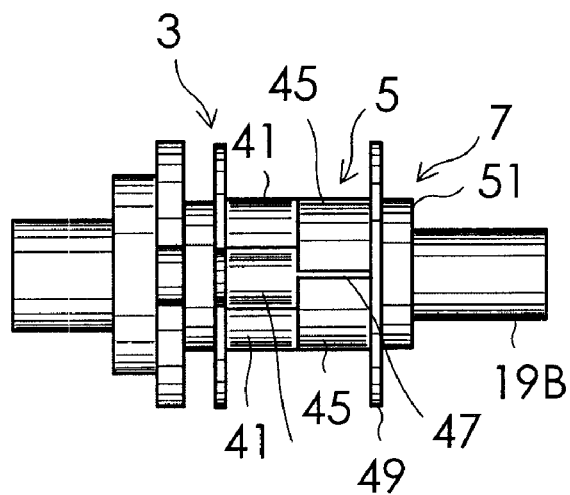

Now, below described is a method for manufacturing the motor rotor of this embodiment. FIGS. 7(A) to 7(D) are used to illustrate an upstream process of the method for manufacturing the motor rotor of this embodiment. FIGS. 8(A) to 8(D) are used to illustrate a downstream process of the method for manufacturing the motor rotor of this embodiment. First, as shown in FIGS. 7(A) and 7(B), the partition wall member 3 is fitted on the shaft center portion 23 of the rotary shaft structure 1 such that an end of the cylindrical portion 31 of the partition wall member 3 abuts on the first annular member 21, forming the annular passage 35 having the bottom portion 35a between the partition wall portion 33 and the first annular member 21. As shown in FIGS. 7(B) and 7(C), the permanent magnet layer 5 (two first-type permanent magnet magnetic pole portions 41, two first-type salient pole portions 43, two second-type permanent magnet magnetic pole portions 45, and two second-type salient pole portions 47) is formed on the magnet mounting portion 29, which is exposed on an outer surface of the shaft center portion 23. Then, the second annular member 7 is fitted on the second rotary shaft portion 19B such that the annular portion 49 of the second annular member 7 abuts on the other end of the shaft center portion 23 in the direction of the axis X (opposite to the end at which the first annular member 21 is mounted).

Figure 7D:
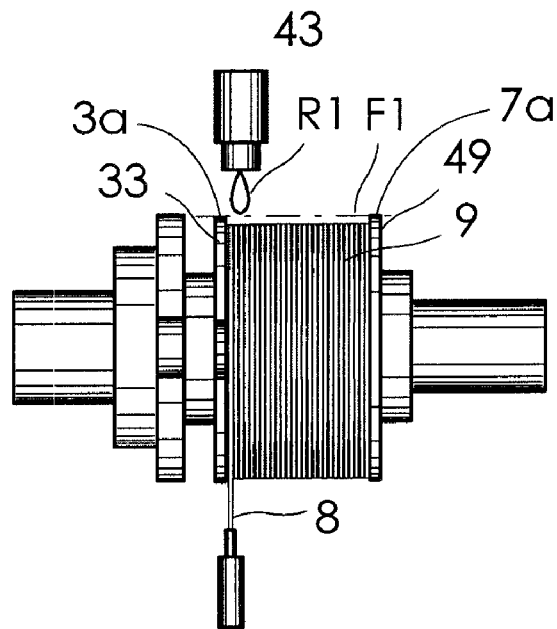

As shown in FIG. 7(D), the thread layer 9 is formed by winding the thread 8 of a reinforced fiber material around the permanent magnet layer 5 under high tension with a gap formed between the outer peripheral surface of the thread layer 9 and an imaginary surface F1 extending between the radially outer periphery of the partition wall member 33 and the radially outer periphery of the annular portion 49. The thread layer 9 is then impregnated with a first curable resin R1.

Figure 8A:
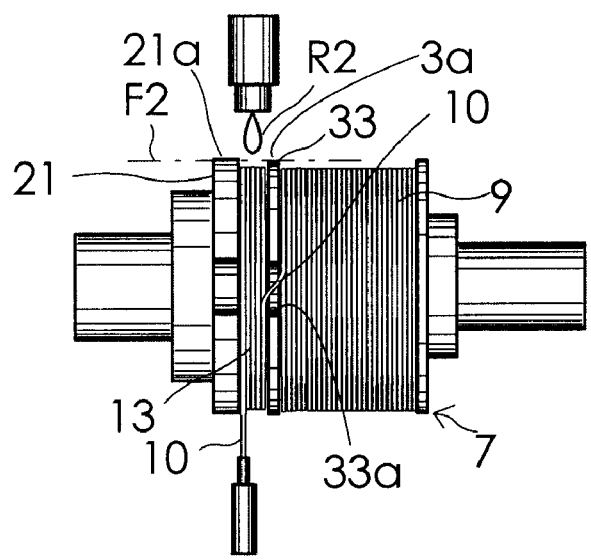
FIGS. 8(A) to 8(D) are used to describe a downstream process of the method for manufacturing the motor rotor shown in FIG. 1.

As shown in FIG. 8(A), the subsequent thread layer 13 is formed by leading the continuous thread 10, which is continuous with the thread 8 forming the thread layer 9, into the annular passage 35 through the thread passing recesses 33a and winding the continuous thread 10 around the bottom portion 35a of the passage 35 (the outer periphery of the cylindrical portion 31 of the partition wall member 3) under high tension with a gap formed between the outer peripheral surface of the subsequent thread layer 13 and an imaginary surface F2 extending between the radially outer periphery of the first annular member 21 and the radially outer periphery of the partition wall portion 33. In this embodiment, the continuous thread 10 is wound around the bottom portion 35a of the passage 35 under a tension of 3 kgf or more. The subsequent thread layer 13 is then impregnated with a second curable resin R2. In this embodiment, the second curable resin R2 is of the same material as the first curable resin R1 with which the thread layer 9 is impregnated. The second curable resin R2 may not necessarily be of the same material as the first curable resin R1.

Figure 8B:
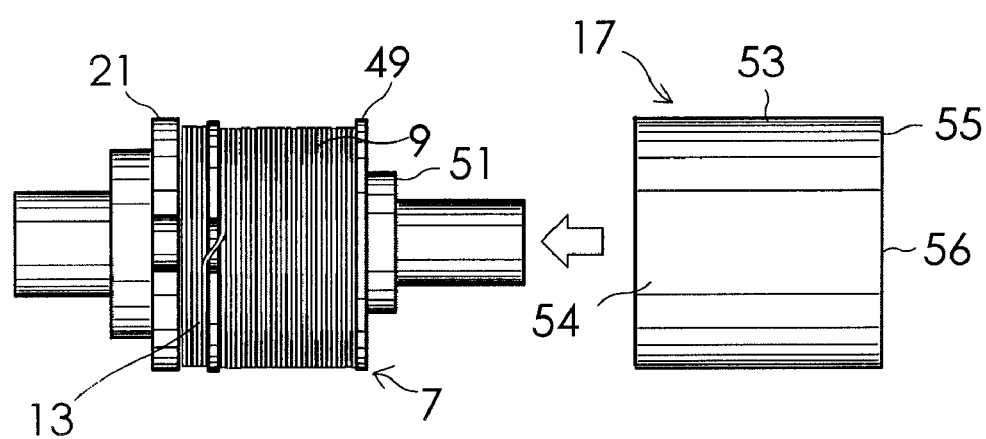

As shown in FIG. 8(B), the cylindrical member 17 is fixed to the first and second annular members 21, 7 by shrink fitting. Specifically, after the cylindrical member 17 is heated to be expanded, the cylindrical member 17 is mounted on the first and second annular members 21, 7 so that the one opening portion 54 of the cylindrical body 53 may be located at the outer periphery of the first annular member 21 and the flange 55 may be located on the boss 51. Then, the cylindrical member 17 is cooled to be shrunk. This allows the one opening portion 54 of the cylindrical body 53 to be strongly coupled to the outer periphery of the first annular member 21, and also allows the annular inner surface of the flange 55 to tightly abut on the outer end surface of the boss 51 of the second annular member 7. The cylindrical member 17 is thus fixed to the first and second annular members 21, 7 securely.

Figure 8C:
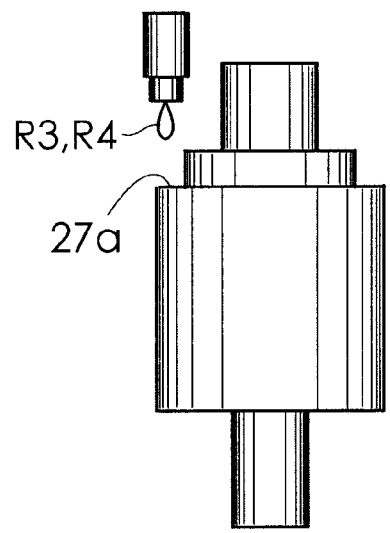

As shown in FIG. 8(C), a third curable resin R3 is injected into the gap between the outer peripheral surface 9a of the thread layer 9 and the inner peripheral surface 53a of the cylindrical body 53 through the resin injection passages 27a and the thread passing recesses 33a. A fourth curable resin R4 is injected into the gap between the outer peripheral surface 13a of the subsequent thread layer 13 and the inner peripheral surface 53a of the cylindrical body 53 through the resin injection passages 27a. The third and fourth curable resins R3, R4 are injected before the first and second curable resins R1, R2 are cured. The third and fourth curable resins R3, R4 are also of the same material as the first curable resin R1 with which the thread layer 9 is impregnated. The third and fourth curable resins R3, R4 also may not necessarily be of the same material as the first curable resin R1.

Figure 8D:
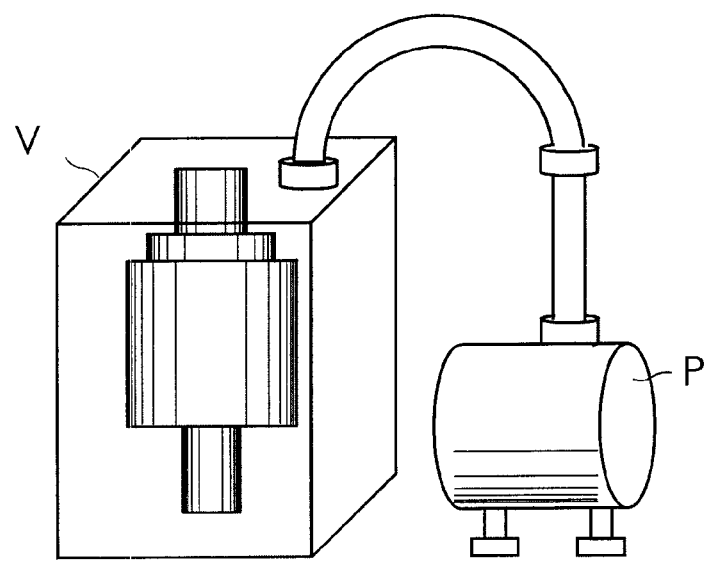

As shown in FIG. 8(D), the motor rotor is disposed in a vacuum chamber V, which is then evacuated to a vacuum by a vacuum pump P so that air bubbles contained in the first to fourth curable resins R1 to R4 are removed through the resin injection passages 27a and the thread passing recesses 33a. Then, the motor rotor is heated to cure the first to fourth curable resins R1 to R4 at one time. The motor rotor is thus completed.

According to the motor rotor of this embodiment, the resin layer 11 is formed in the gap between the outer peripheral surface 9a of the thread layer 9 and the inner peripheral surface 53a of the cylindrical body 53. Consequently, the gap between the outer peripheral surface 9a of the thread layer 9 and the inner peripheral surface 53a of the cylindrical body 53 is filled with a resin. Therefore, it is unlikely that a void will be formed between the cylindrical body 53 and the thread layer 9 even if the motor rotor is rotated at a high speed (of at least 150,000 rpm, for example). The curable resin forming the resin layer 11 is strongly solidified compared to the curable resin with which the thread layer 9 is impregnated. Thus, even if the motor rotor is rotated at a high speed and the resin with which the thread layer 9 is impregnated is subjected to a centrifugal force, the resin layer 11 protects the resin with which the thread layer 9 is impregnated. This prevents the resin in the thread layer 9 from being broken. The gap between the thread layer 9 and the cylindrical body 53 is filled with a curable resin after the first annular member 21 is fitted in the one opening portion 54 of the cylindrical body 53, allowing the gap between the thread layer 9 and the cylindrical body 53 to be fully filled with the curable resin. The motor rotor may be manufactured by simple processes such as fitting components (1, 3, etc.).

FIG. 9 is an enlarged view showing an engagement portion between a cylindrical member and a partition wall member of a motor rotor according to another embodiment of the present invention. In FIG. 9, components common to the components of the motor rotor 1 as the above embodiment of the present invention are denoted by reference numerals obtained by adding 100 to the reference numerals affixed to their counterparts of the motor rotor 1 and their descriptions are partially omitted. In this embodiment, an annular projection 153c projecting radially inwardly of the rotary shaft structure 101 is integrally formed in the one opening portion 154 of the cylindrical body 153 to form a stepped portion 153b in the cylindrical body 153. The stepped portion 153b is engaged with a radially outer end portion 133b of the partition wall portion 133. In this embodiment, the radially outer end portion 133b of the partition wall portion 133 projects toward the projection 153c. This prevents the terminated end of the subsequent thread layer 113 from coming out of the partition wall portion 133. With the stepped portion 153b formed in the cylindrical body 153, the cylindrical member 117 may be fixed to the first and second annular members more firmly.

Although the partition wall member 3, 103 is provided to form the subsequent thread layer 13, 113 in the above embodiments, the provision of a partition wall member and the formation of a subsequent thread layer are optional in the present invention. If a subsequent thread layer is not formed, the first annular member and the second annular member are mounted in proximity to both sides of the magnet mounting portion. In this configuration, the terminated end of the thread is fixed by the resin layer.

INDUSTRIAL APPLICABILITY

According to the present invention, the resin layer is formed in the gap between the outer peripheral surface of the thread layer and the inner peripheral surface of the cylindrical member and the gap between the outer peripheral surface of the thread layer and the inner peripheral surface of the cylindrical member is filled with a resin. As a result, no void will be formed between the cylindrical member and the thread layer even if the motor rotor is rotated at a high speed. The resin layer that is positively formed only of a curable resin adheres to the cylindrical member with higher adhesion compared to a thin resin layer that is formed by a part of a curable resin with which a thread layer is impregnated and which has been cured. Thus, even if the motor rotor is rotated at a high speed and the resin with which the thread layer is impregnated is subjected to a centrifugal force, the resin layer positively formed on the outer side of the thread layer prevents peeling between the thread and the resin with which the thread layer is impregnated.

The gap between the thread layer and the cylindrical member is filled with a curable resin after the first annular member is fitted in the one opening portion of the cylindrical member located on the one end in the axial direction of the rotary shaft, allowing the gap between the thread layer and the cylindrical member to be fully filled with the curable resin.

The partition wall member may be provided to form the annular passage between the partition wall member and the first annular member, and the subsequent thread layer may be formed by leading the continuous thread, which is continuous with the thread forming the thread layer, into the annular passage and winding the continuous thread around the bottom portion of the passage under high tension. The continuous thread forming the subsequent thread layer will not become loose because of the friction between the continuous thread in the subsequent thread layer and the first annular member and the partition wall member or the friction between windings of the continuous thread. This advantageously allows the terminated end of the thread forming the thread layer to be retained easily and reliably.

The invention claimed is:
1. A motor rotor comprising:
a rotary shaft having a magnet mounting portion;
a permanent magnet layer formed of a plurality of permanent magnets disposed on a surface of the magnet mounting portion;
a thread layer formed by winding a thread of a reinforced fiber material around the permanent magnet layer, the thread layer being impregnated with a curable resin;
first and second annular members provided on the rotary shaft and respectively disposed on both ends of the magnet mounting portion in an axial direction of the rotary shaft;

a cylindrical member fixed to the first and second annular members to cover a surface of the thread layer from a radially outer side of the rotary shaft with a gap formed between an outer peripheral surface of the thread layer and an inner peripheral surface of the cylindrical member; and a resin layer formed of a curable resin which has been injected into the gap and cured;

wherein the first annular member is fitted in one opening portion of the cylindrical member located on one end in the axial direction, and is formed with one or more resin injection passages for injecting the curable resin into the gap between the thread layer and the cylindrical member, and the second annular member tightly seals the other opening portion of the cylindrical member located on the other end in the axial direction;

wherein the second annular member is disposed adjacent to an end of the magnet mounting portion on the other end in the axial direction; and the motor rotor further comprises:

an annular partition wall member concentrically disposed on the rotary shaft between the first and second annular members, the partition wall member being disposed adjacent to an end of the magnet mounting portion on the one end in the axial direction so as to form an annular passage having a bottom portion located between the first annular member and the partition wall member, the partition wall member being formed, in its outer periphery, with one or more thread passing recesses that allow a continuous thread, which is continuous with the thread forming the thread layer, to pass through and also allow the curable resin injected from the resin injection passage to pass through;

a subsequent thread layer is formed of the continuous thread that has passed through the thread passing recesses, and has been led into the annular passage and wound around the bottom portion under high tension with a gap formed between an outer peripheral surface of the subsequent thread layer and the inner peripheral surface of the cylindrical member, the subsequent thread layer being impregnated with a curable resin; and a resin layer extension is formed of the curable resin which has been injected into the gap from the resin injection passages and cured.

2. The motor rotor according to claim 1, wherein the rotary shaft is for use in a high-speed motor that rotates at a high speed of at least 150,000 revolutions per minute.

3. The motor rotor according to claim 1, wherein the one or more resin injection passages penetrate the first annular member in the axial direction and open radially outwardly, and are formed at intervals in a circumferential direction of the rotary shaft.

4. The motor rotor according to claim 1, wherein the continuous thread is wound around the bottom portion under such tension that prevents the continuous thread forming the subsequent thread layer from becoming loose.

5. The motor rotor according to claim 4, wherein the tension is 3 kgf or more.

6. The motor rotor according to claim 1, wherein a plurality of the thread passing recesses are formed at intervals in the circumferential direction of the rotary shaft.

7. The motor rotor according to claim 1, wherein the curable resin is a thermosetting resin.

8. The motor rotor according to claim 1, wherein
the rotary shaft has a composite structure comprising a first rotary shaft portion supported by a bearing, the first annular member, a shaft center portion including the magnet mounting portion, and a second rotary shaft portion that are sequentially arranged in this order in the axial direction;
the partition wall member includes a cylindrical portion fitted on the shaft center portion and an annular partition wall portion integrally formed with an end of the cylindrical portion; and
the annular passage is defined by the first annular member, the partition wall portion, and the cylindrical portion with an end of the cylindrical portion abutting on the first annular member.

9. The motor rotor according to claim 8, wherein the first rotary shaft portion, the first annular member, the shaft center portion, and the second rotary shaft portion are integrally formed with each other.

10. The motor rotor according to claim 8, wherein
the shaft center portion is formed at a center portion of the rotary shaft and has a cylindrical shape;
the second annular member includes a boss fitted on the rotary shaft and an annular portion integrally formed with the boss and extending radially from an end of the boss on a side of the shaft center portion, the second annular member being fitted on the second rotary shaft portion and positioned to abut on an end surface of the shaft center portion on a side of the second rotary shaft portion; and
the cylindrical member includes a cylindrical body and an annular flange integrally formed with the cylindrical body and extending radially inwardly from an end of the cylindrical body on a side of the other opening portion, the cylindrical member being assembled with the first and second annular members such that the inner peripheral surface of the cylindrical member at the one opening portion is coupled to an outer peripheral surface of the first annular member and an annular inner surface of the flange abuts on an outer peripheral surface of the boss of the second annular member.

11. The motor rotor according to claim 1, wherein the cylindrical member is fixed to the first and second annular members by shrink fitting.

12. The motor rotor according to claim 11, wherein
a projection is integrally formed in the one opening portion of the cylindrical member to project radially inwardly of the rotary shaft so as to form a stepped portion in the cylindrical member; and
the stepped portion is engaged with a radially outer end portion of the partition wall portion.

13. A method for manufacturing a motor rotor that includes:
a rotary shaft having a magnet mounting portion;
a permanent magnet layer formed of a plurality of permanent magnets disposed on a surface of the magnet mounting portion;
a thread layer formed by winding a thread of a reinforced fiber material around the permanent magnet layer;
first and second annular members provided on the rotary shaft so as not to move relative to the rotary shaft in an axial direction of the rotary shaft and respectively disposed on both ends of the magnet mounting portion in the axial direction; and
a cylindrical member fixed to the first and second annular members to cover a surface of the thread layer from a radially outer side of the rotary shaft, the first annular member being formed with one or more resin injection passages for injecting a curable resin into a gap between the thread layer and the cylindrical member after the first annular member is fitted in one opening portion of the cylindrical member located on one end in the axial direction;

an annular partition wall member concentrically disposed on the rotary shaft between the first and second annular members, the partition wall member being formed, in its outer periphery, with one or more thread passing recesses that allow a continuous thread, which is continuous with the thread forming the thread layer, to pass through and also allow the curable resin injected from the resin injection passages to pass through; and a subsequent thread layer formed by winding the continuous thread around a portion of the partition wall member, the method comprising the steps of:

preparing the rotary shaft having a composite structure comprising a first rotary shaft portion supported by a bearing, the first annular member, a shaft center portion including the magnet mounting portion, and a second rotary shaft portion that are integrally formed and sequentially arranged in this order in the axial direction;

fitting the partition wall member on the shaft center portion of the rotary shaft so as to form an annular passage having a bottom portion between the partition wall member and the first annular member;

forming the permanent magnet layer on the magnet mounting portion included in the shaft center portion;

fitting the second annular member on the second rotary shaft portion to fix the second annular member to the rotary shaft with the second annular member abutting on an end of the shaft center portion on the other end in the axial direction, before or after forming the permanent magnet layer;

forming the thread layer by winding the thread around the permanent magnet layer with a gap formed between an outer peripheral surface of the thread layer and an imaginary surface extending between a radially outer periphery of the partition wall member and a radially outer periphery of the second annular member;

impregnating the thread layer with a first curable resin;

forming the subsequent thread layer by leading the continuous thread into the annular passage through the thread passing recesses and winding the continuous thread around the bottom portion under high tension with a gap formed between an outer peripheral surface of the subsequent thread layer and an imaginary surface extending between a radially outer periphery of the first annular member and the radially outer periphery of the partition wall member;

impregnating the subsequent thread layer with a second curable resin;

fixing the cylindrical member to the first and second annular members so as to cover the surfaces of the thread layer and the subsequent thread layer from the radially outer side of the rotary shaft;

filling a gap between the outer peripheral surface of the thread layer and an inner peripheral surface of the cylindrical member with a third curable resin through the one or more resin injection passages formed in the first annular member and the one or more thread passing recesses formed in the partition wall member;

filling a gap between the outer peripheral surface of the subsequent thread layer and the inner peripheral surface of the cylindrical member with a fourth curable resin through the one or more resin injection passages; and curing the third and fourth curable resins.

14. The method for manufacturing a motor rotor according to claim 13, wherein the first to fourth curable resins are thermosetting resins of the same quality of material, and the third and fourth curable resins are injected before the first and second curable resins are cured so that the first to fourth curable resins are cured at one time.

15. The method for manufacturing a motor rotor according to claim 14, wherein air bubbles contained in the first to fourth curable resins are removed through the one or more resin injection passages and the one or more thread passing recesses before the first to fourth curable resins are cured at one time.

16. The method for manufacturing a motor rotor according to claim 13, wherein the cylindrical member is fixed to the first and second annular members by shrink fitting.

17. The motor rotor according to claim 1, wherein the curable resin is a thermosetting resin.

* * * * *